May 10, 1949.   I. I. SIKORSKY   2,469,480
ROTOR BLADE
Filed Oct. 13, 1943
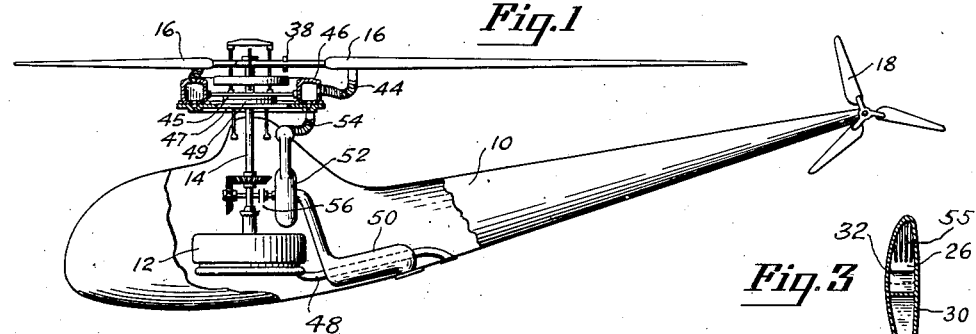
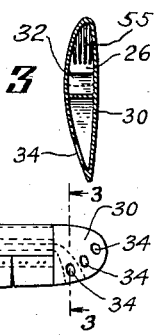
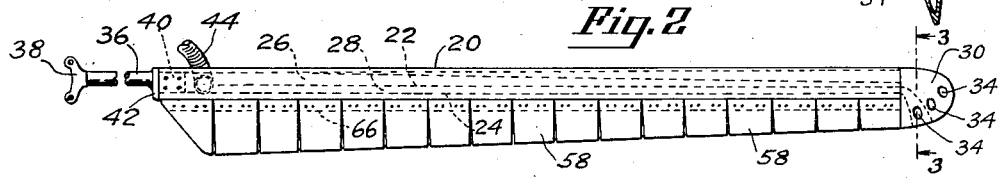
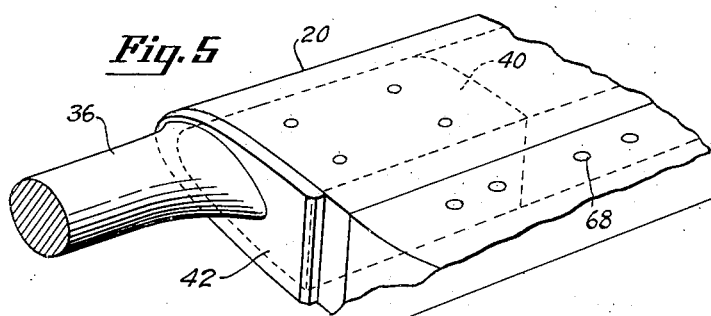
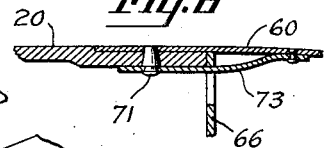
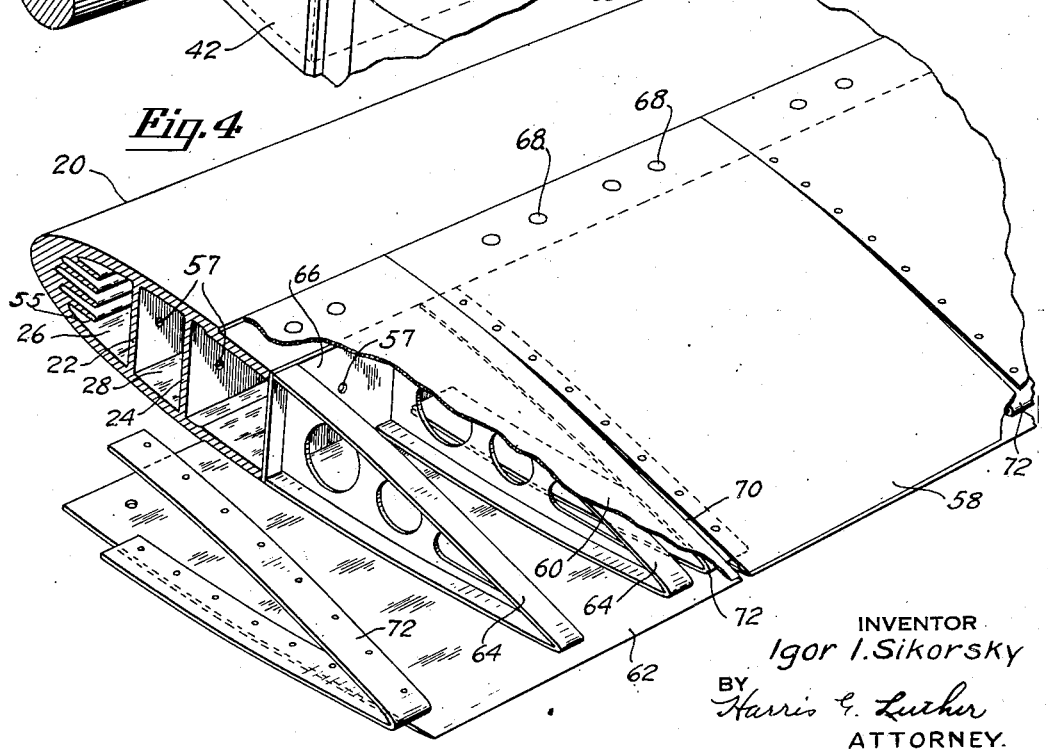
INVENTOR
Igor I. Sikorsky
BY
Harris G. Luther
ATTORNEY.

Patented May 10, 1949

2,469,480

UNITED STATES PATENT OFFICE 2,469,480

ROTOR BLADE

Igor I. Sikorsky, Bridgeport, Conn., assignor to United Aircraft Corporation, East Hartford, Conn., a corporation of Delaware Application October 13, 1943, Serial No. 506,058

12 Claims. (Cl. 244—134)

This invention relates to blades and more particularly to rotor blades for rotary wing aircraft.

An object of the invention is to provide a simple strong rotor blade.

A further object is to provide a rotor blade in which the leading edge section is an extruded metal structural member.

Another object is the provision of a rotor blade through which hot gases may be passed to prevent the formation of ice thereon.

Other objects and advantages will be apparent from the specification and claims, and from the accompanying drawing which illustrates what is now considered to be a preferred embodiment of the invention.

In the drawing,

Fig. 1 is a schematic side elevational view of a helicopter, having the improved blade and means for supplying hot gas thereto.

Fig. 2 is an enlarged view of the rotor blade.

Fig. 3 is a section on lines 3—3 of Fig. 2.

Fig. 4 is an enlarged perspective view showing a cross section of the structural member and the details of the blade trailing edge.

Fig. 5 is an enlarged perspective view showing the method of attaching the blade support, and Fig. 6 is a detail of the trailing edge fastening.

Referring to Fig. 1, the helicopter fuselage 10 carries an engine 12 driving a rotor shaft 14 on which are mounted rotor blades 16. An auxiliary propeller 18 is carried at one end of the fuselage 10 and may be driven by rotor shaft 14.

Each rotor blade 16 is built up of several members, including a structural member 20 forming the strength member of the blade. Structural member 20 is preferably of uniform cross section from one end to the other and has one or more partitions 22, 24 therein dividing the member into one or more tube-like sections 26, 28 extending the length thereof. This structural member may be conveniently formed by an extrusion process.

A tip-forming member 30 is secured, by welding or otherwise, to one end of the structural member 20, closing that end and forming a faired blade tip. Blade tip 30 is provided with one or more partitions 32 dividing the tip into channels connecting with channels 26, 28 of the structural member 20. Apertures 34 in the blade tip provide outlets for the chambers. A support 36 preferably having a hinge connection 38 at one end thereof, supports the structural member 20 on the rotor shaft 14. Support 36 may include a plug 40 located inside of the structural member 20 and riveted or otherwise secured in place. Plate 42 covers the inner end of structural member 20 and closes off any openings not otherwise closed.

The structure thus far described provides structural member 20 supported at one end by support 36 and having a tip-forming portion 30 on the other end in which channels 26, 28 extend the full length of the blade between the support and the tip, and are provided with exits 34 at the tip. A flexible conduit 44 may be utilized to conduct hot gases from the collector 46 to the interior of the structural member 20 for supplying hot gases thereto. If the structural member 20 is made of stainless steel, the hot gases may be the engine exhaust gases, but if the structural member is of aluminum, magnesium, or similar corrosive metals, in order to avoid corrosion, the hot gases may be produced by running the engine exhaust pipe 48 through a heat exchanger 50 and heating air. The exhaust gas or the heated air may be passed through the blower 52 and the flexible conduit 54 to the collector 46 and thence to the structural member 20. A clutch 56 may be provided for controlling the operation of the blower 52.

In order to increase the heat absorbing area of the structural member 20 adjacent the leading edge thereof, fins 55 may be provided on the interior surface as shown in Fig. 4. These fins may be of substantially uniform size throughout the length of the blade but in the now preferred construction, they will taper so as to increase in size and area from the shank toward the tip of the blade, so as to give greater heat absorption at the blade tip where the gases will be cooler and the radiation greater (because of greater air speed of the blade tip) than at the blade shank.

The collector 46 is supported on shaft 14 and rotating plate 45 of the pitch changing mechanism. A sliding joint is provided between the collector and the flexible conduit 54. The stationary portion of the sliding joint is supported on stationary plate 47 of the pitch changing mechanism.

Small apertures 57 may be provided in the various partitions 22, 24 and 66 to permit bleeding of hot gases from one passage to another and to the interior of the trailing edge to be presently described, to give a more uniform gradation of heat and pressure over the width of the blade.

The blade section is completed by fastening

V-shaped trailing edge forming members to the rear portion of the structural member 20. The trailing edge members indicated as 58, are built up of sheet material forming the top portion 60 and the bottom portion 62. These sheets meet at one edge to form the blade trailing edge and are separated at the opposite edge to thereby form the V-shaped member. Ribs 64 are fastened to the sheets as by weldig or riveting to reinforce and stiffen the sheets. The ribs 64 abut the plate or partition 66 secured to or forming a part of structural member 20 and the sheets 60 and 62 forming the top and bottom surfaces of the trailing edge member, overlap onto the structural member and are secured thereto by means such as rivets, screws, or spring catches 68.

A detail of one fastening means is shown in Fig. 6 in which the structural member 20 and sheet 60 are provided with registering holes and a tapered pin 71 is positioned therein by its supporting spring 73.

Sheets 60 and 62 abut adjacent sheets of the trailing edge portions on either side where they overlap the structural member but are spaced from the adjacent sheets at the trailing edge as indicated at 70. An insert of strip material 72 secured to sheets 60 and 62 of one trailing edge portion underlies the joint formed with the adjacent trailing edge portion to close the gap 70.

This construction permits flexing of the structural member 20 in a fore-and-aft direction without distortion of the trailing edge. Such a construction also permits ready removal and replacement of any damaged trailing edge portion and where the blade is made of uniform width throughout, provides for interchangeability whereby one trailing edge member may be used to replace a damaged section anywhere in the length of the blade.

It has been found that under some conditions lift forces have a tendency to flex the rotor blades in a transverse direction a greater amount than is desirable. By making the blade of uniform cross section throughout the length, the additional weight in the outer portion of the blade tends, under the action of centrifugal force, to provide a blade straightening force which reduces the flexing of the blade. A blade having a uniform section therefor, in addition to providing an easily fabricated structure, also produces a blade having superior structural qualities and an improved performance.

It is to be noted that the leading edge of the structural member 20 is of greater thickness than the other portions of the member. This increased mass advances the center of gravity of member 20 to a point ahead of a point equidistant from the leading and trailing portions of the member. Such a concentration of mass in the leading edge reduces the vibrations in the blade when the blade is subjected to aerodynamic forces. Since the member 20 may be extruded as one piece, the mass in the leading edge is integral therewith and adds to the structural integrity of the member. The heat transfer fins 55 are also integral with the member 20 and serve to increase the strength. Thus, the member may be extruded as an integral structure having great strength in addition to desirable aerodynamic characteristics.

It is to be understood that the invention is not limited to the specific embodiment herein illustrated and described, but may be used in other ways without departure from its spirit as defined by the following claims.

I claim:

1. A rotor blade for a helicopter comprising a hollow metal leading edge and strength member having a center of gravity lying ahead of a point equidistant from the foremost and rearmost points of said member, means secured at one end of said member for supporting the same on a drive shaft, means secured to the other end for closing the same and forming a blade tip, and a series of detachable trailing edge portions secured to said member, said trailing edge portions being substantially in contact with each other at their leading edges and spaced apart at their trailing edges, whereby said blade may flex in a fore-and-aft direction.

2. A rotor blade for a helicopter comprising a hollow metal leading edge and strength member having a center of gravity lying ahead of a point equidistant from the foremost and rearmost points of said member, means secured to one end of said member for supporting the same on a drive shaft, means secured to the other end for closing the same and forming a blade tip, and a series of detachable trailing edge portions secured to said member, said trailing edge portions being substantially in contact at their forward edges and spaced apart at their trailing edges, whereby said blade may flex in a fore-and-aft direction, and means within said trailing edge portions closing the gap in the spaced apart portion between said trailing edge portions.

3. A metal rotor blade for a helicopter comprising a hollow metal leading edge and strength member having a center of gravity lying ahead of the 25% chord point of the blade, means secured to one end of said member for supporting the same on a drive shaft, means secured to the other end for closing the same and forming a blade tip, and a series of detachable hollow metal trailing edge portions secured to said member, said trailing edge portions being spaced apart spanwise in the vicinity of their trailing edges to permit said leading edge member to flex in a fore and aft direction, and means within said trailing edge portions for closing the space between said trailing edge portions.

4. A rotor blade for a helicopter comprising a hollow extruded metal leading edge and strength member having a center of gravity lying ahead of the 25% chord point of the blade, means secured to one end of said member for supporting the same on a drive shaft, means secured to the other end for closing the same and forming a blade tip, and a series of detachable trailing edge members secured to said leading edge member in a spanwise row, said trailing edge members being made of sheet metal and V-shaped in cross section, reinforcing members extending chordwise in said V-shaped members from said leading edge member to the trailing edges of said trailing edge members and located at the chordwise junction of said trailing edge members, means securing said reinforcing members to said V-shaped members, and means securing said trailing edge members to said leading edge member to form a blade of airfoil cross section.

5. A rotor blade comprising a one piece hollow structural member of substantially uniform cross section throughout its length forming the leading edge portion of said blade and having a center of gravity lying ahead of the 25% chord point of the blade, and a series of separate detachable trailing edge members secured on said structural member and completing the blade section, said trailing edge members being spaced apart spanwise adjacent their trailing edges whereby said blade may flex in a fore and aft direction without transmitting stresses to said trailing edge members.

6. A rotor blade comprising a hollow structural member forming the leading edge portion of said blade and having a center of gravity lying ahead of a point equidistant from the foremost and rearmost points of said member, partitions running lengthwise of said member dividing said member into a plurality of passages, apertures in said partitions connecting said passages, trailing edge portions mounted on said structural member, a partition separating said passages from the interior of said trailing edge portions, and apertures in said last named partition connecting said passages with the interior of said trailing edge portions.

7. An airfoil having a tip portion and an inner portion and comprising a hollow metal structural member forming the leading edge portion of said airfoil and having a center of gravity lying ahead of a point equidistant from the foremost and rearmost points of said member, and having a passage therein for containing heated fluid, heat absorbing fins extending into said passage on the interior of said member for absorbing heat and assisting in conducting heat from said passage to the exterior of said member, said fins increasing in surface area from said inner portion toward said tip portion.

8. A rotor blade having a shank portion and a tip portion and comprising a hollow metal structural member forming the leading edge portion of said blade, said member having a center of gravity lying ahead of a point equidistant from the foremost and rearmost points of said member and having a chamber therein for receiving heated fluid, heat absorbing fins extending into said chamber on the interior of said member for absorbing heat and assisting in conducting heat from said chamber to the exterior of said member, said fins increasing in surface area from the shank portion toward the tip portion of said blade.

9. A rotor blade for a helicopter comprising an integral hollow metal leading edge and strength member comprising substantially one-half the chordwise extent of the blade and having a center of gravity lying ahead of the 25% chord point of the blade, means secured to one end of said member for supporting the same on a drive shaft, means secured to the other end of said member for closing the same and forming a blade tip, and a spanwise disposed hollow metal trailing edge portion secured on said member and comprising the remainder of the chordwise extent of the blade, said trailing edge portion comprising a series of spanwise arranged hollow metal members V-shaped in cross section, chordwise extending reinforcing members within said V-shaped members extending from said leading edge member to the trailing edge of said trailing edge portion, means securing said reinforcing members to said V-shaped members, and means for attaching said V-shaped members to said leading edge member to form a blade of airfoil cross section.

10. A metal rotor blade for a helicopter having a hollow one-piece metal extrusion of uniform cross section throughout its length constituting the sole spanwise strength member of the blade, said extrusion including a U-shaped nose portion comprising the leading edge of the blade, generally parallel trailing portions and at least one spanwise extended member bridging said trailing portions, means secured to one end of said extrusion for supporting the same on a rotor drive shaft, means secured to the other end thereof for closing the same and forming a blade tip, and a series of hollow metal members of generally V-shaped cross section having their spanwise edges secured to the spanwise edges of the trailing portions of said extrusion so that the aligned apexes of said hollow members form the trailing edge of the blade, said hollow members being spaced spanwise in the vicinity of their trailing edges to form gaps therebetween for permitting relative movement between said members due to bending of said extrusion in a fore and aft direction, and means within said hollow members for bridging the gap between adjacent members.

11. A metal rotor blade for a helicopter having a hollow one-piece metal extrusion of uniform cross section throughout its length constituting the sole spanwise strength member of the blade, said extrusion including a U-shaped nose portion comprising the leading edge of the blade, generally parallel trailing portions and at least one spanwise extended member bridging said trailing portions, means secured to one end of said extrusion for supporting the same on a rotor drive shaft, means secured to the other end thereof for closing the same and forming a blade tip, and a series of hollow metal members of generally V-shaped cross section having their spanwise edges secured to the spanwise edges of the trailing portions of said extrusion so that the aligned apexes of said members form the trailing edge of the blade, said hollow members being spaced spanwise in the vicinity of their trailing edges to form gaps therebetween for permitting relative movement between said members due to bending of said extrusion in a fore and aft direction, and means bridging the gap between said members and overlying only the adjacent chordwise edges thereof for sealing the gap between adjacent members against the passage of air therethrough.

12. A metal rotor blade for a helicopter having a hollow one-piece metal extrusion of uniform cross section throughout its length constituting the sole spanwise strength member of the blade, said extrusion including a U-shaped nose portion of relatively heavy section comprising the leading edge of the blade, generally parallel trailing portions of somewhat lighter section, and at least one spanwise extended member bridging said trailing portions, means secured to one end of said extrusion for supporting the same on a rotor drive shaft, means secured to the other end thereof for closing the same and forming a blade tip, and a series of hollow light metal members of generally V-shaped cross section having their spanwise edges secured to the spanwise edges of the trailing portions of said extrusion so that the aligned apexes of said members form the trailing edge of the blade, said hollow members being spaced spanwise in the vicinity of their trailing edges to form gaps therebetween for permitting relative movement between said members due to bending of said extrusion in a fore and aft direction, and means within said hollow members for bridging the gap between adjacent members including chordwise disposed supporting members secured to chordwise edges of said hollow members.

IGOR I. SIKORSKY.

(References on following page)

REFERENCES CITED

The following references are of record in the file of this patent:

UNITED STATES PATENTS

| Number | Name | Date |
|---|---|---|
| 1,031,452 | Korf | July 2, 1912 |
| 1,344,661 | Strong | June 29, 1920 |
| 1,795,970 | Rohrbach | Mar. 10, 1931 |
| 1,797,160 | Spencer | Mar. 17, 1931 |
| 1,821,776 | Vining | Sept. 1, 1931 |
| 2,019,272 | Ragsdale | Oct. 29, 1935 |
| 2,050,327 | Howard | Aug. 11, 1936 |
| 2,152,861 | Bennett | Apr. 4, 1939 |
| 2,303,707 | Pullin | Dec. 1, 1942 |
| 2,320,870 | Johnson | June 1, 1943 |
| 2,330,632 | Seligman | Sept. 28, 1943 |

FOREIGN PATENTS

| Number | Country | Date |
|---|---|---|
| 206,843 | Great Britain | Feb. 9, 1925 |
| 303,360 | Great Britain | Nov. 7, 1929 |
| 432,555 | Great Britain | July 23, 1935 |